March 28, 1961  H. M. McKAY  2,977,094
LANDING GEAR FOR TRAILERS
Filed Nov. 8, 1957  3 Sheets-Sheet 1

INVENTOR
HARRY M. McKAY
BY Cohn and Powell
ATTORNEYS

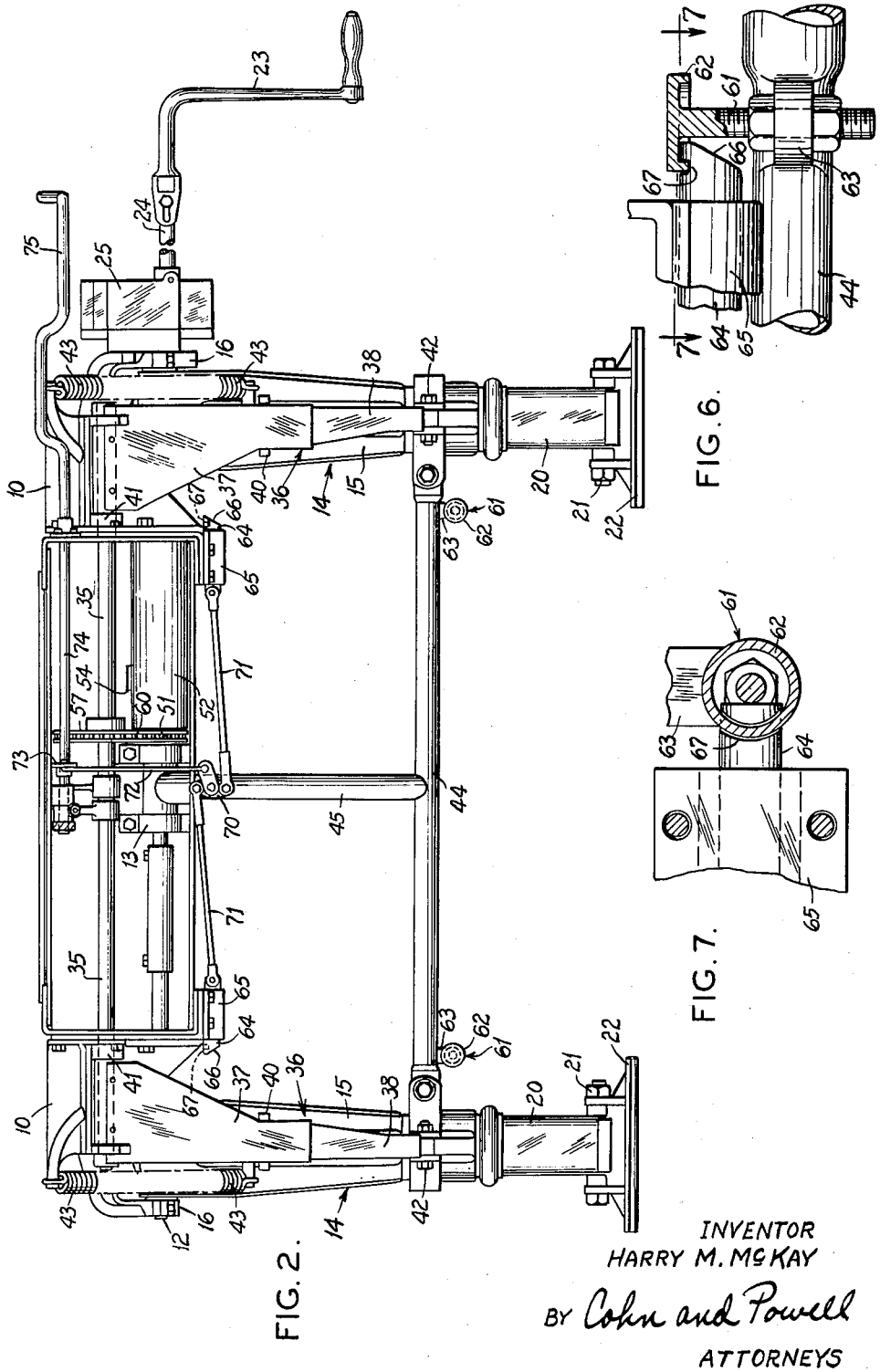

March 28, 1961 H. M. McKAY 2,977,094
LANDING GEAR FOR TRAILERS
Filed Nov. 8, 1957 3 Sheets-Sheet 3

INVENTOR,
HARRY M. McKAY.
BY Cohn and Powell
ATTORNEYS

United States Patent Office 2,977,094
Patented Mar. 28, 1961

2,977,094

LANDING GEAR FOR TRAILERS

Harry M. McKay, Warrenton, Mo., assignor, by mesne assignments, to Binkley Landing Gear Sales Co., a corporation of Missouri Filed Nov. 8, 1957, Ser. No. 695,254

13 Claims. (Cl. 254—86)

This invention relates generally to improvements in landing gear for trailers, and more particularly to an improved double retractable landing gear.

It is an important object of the present invention to realize a landing gear that is quickly and easily retracted and extended, and one that provides a large ground clearance when disposed in the retracted position.

Another important objective is achieved by the provision of a rotatable mechanism that operates to retract a leg section telescopically with respect to another leg section to move the ground-engaging means off of the ground, and then automatically operates to fold the entire supporting leg assembly upwardly to a fully retracted position.

Yet another important object is provided by the operative connection between the rotatable mechanism for telescopically adjusting the leg section and the retractable mechanism for raising and lowering the supporting leg about a hinge mounting so that such retractable mechanism is actuated upon operation of the rotatable mechanism.

Other important objectives are afforded by a clutch connection between the rotatable mechanism and the retractable mechanism previously mentioned that automatically operates in a particular phase of operation of the rotatable mechanism to cause actuation of the retractable mechanism.

Still another important object is realized by the structural connection and arrangement of the clutch to obtain and cause the above mentioned functional advantages and results.

Another important object is realized by the particular structural arrangement of the retractable mechanism for quickly raising and lowering the supporting leg about its hinge mounting and the operative connection and arrangement of the retractable mechanism with the means for causing telescopic adjustment of the leg sections.

Another important object is achieved by the particular structural arrangement of the rotatable mechanism for causing such telescopic adjustment of the leg sections and by the mounting of the leg on the trailer to enable a folding action of the supporting leg about a cooperative element of the rotatable mechanism and mounting structure.

An important objective is realized by providing a landing gear that is simple and durable in construction, economical to manufacture and install, and which is easily and quickly operated by any one without requiring any complicated instructions.

The foregoing and numerous other objects and advantages of the invention will more clearly appear from the following detailed description of a preferred embodiment, particularly when considered in connection with the accompanying drawings, in which:

Fig. 2 is an elevational view of the landing gear as seen along line 2—2 of Fig. 1;

Fig. 6 is an enlarged view of the latch assembly between the landing gear and trailer, and Fig. 7 is a fragmentary view, partially in cross section as seen along line 7—7 of Fig. 6.

Figure 1:
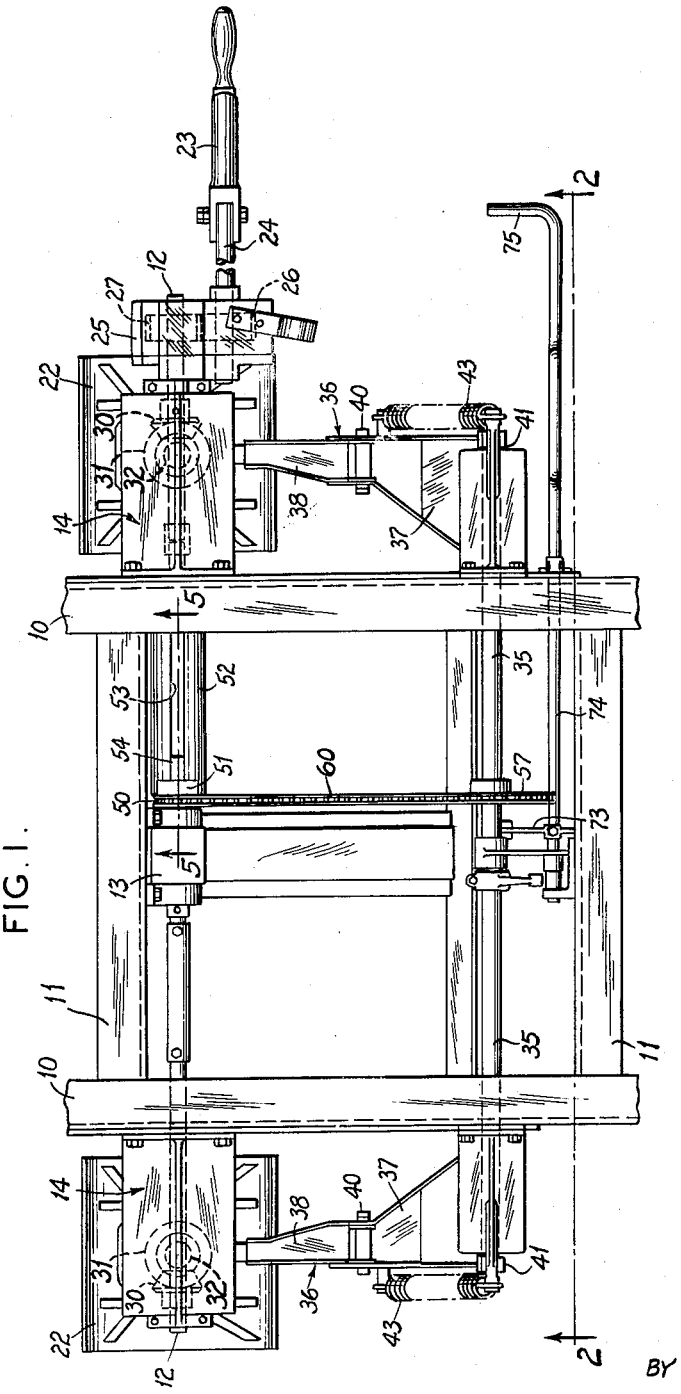
Fig. 1 is a top plan view of the double retractable landing gear.

Referring now by characters of reference to the drawings, the landing gear is adapted to be operatively attached to any trailer, and is adapted to support one end of the trailer after detachment from the tractor. As seen in Fig. 1, the trailer frame includes side longitudinal frames 10 and interconnecting cross frames 11. Rotatively mounted in longitudinal side frames 10 is transverse drive shaft 12 which constitutes an operative element of the rotatable means subsequently described in detail. The drive shaft 12 is rotatively mounted in journal bearing 13 and extends laterally outwardly from each side of the trailer frame structure.

It is seen from Figs. 1 and 2 that the landing gear includes a pair of supporting legs generally indicated at 14 on opposite sides of the trailer frame. Each trailer frame-supporting leg is identical in structure so that the detailed description of one such leg will suffice for the other.

Each supporting leg 14 includes a tubular leg section 15 hingedly mounted by bearing element 16 on drive shaft 12. The leg section 15 is closed by plate 17 at its upper end and is open at its lower end to receive telescopically therein an adjustable tubular leg section 20. Pivotally attached to the lower end of adjustable leg section 20 by pivot bolt 21 is a foot plate 22 constituting a ground-engaging means. Obviously, the pivotal mounting of foot plate 22 enables the plate to conform and adapt to uneven or inclined ground surfaces.

A rotatable mechanism is utilized to connect operatively the telescopically related leg sections 15 and 20, and includes as a component element the drive shaft 12. More particularly, the rotatable means includes a crank handle 23 pivotally attached to a handle shaft 24 that is rotatively mounted in a gear box 25 attached to the tubular casing of the hinged leg section 15. Drivingly connected to handle shaft 24 within gear box 25 is a drive gear 26 that meshes with a driven gear 27 fixed to drive shaft 12.

Figure 4:
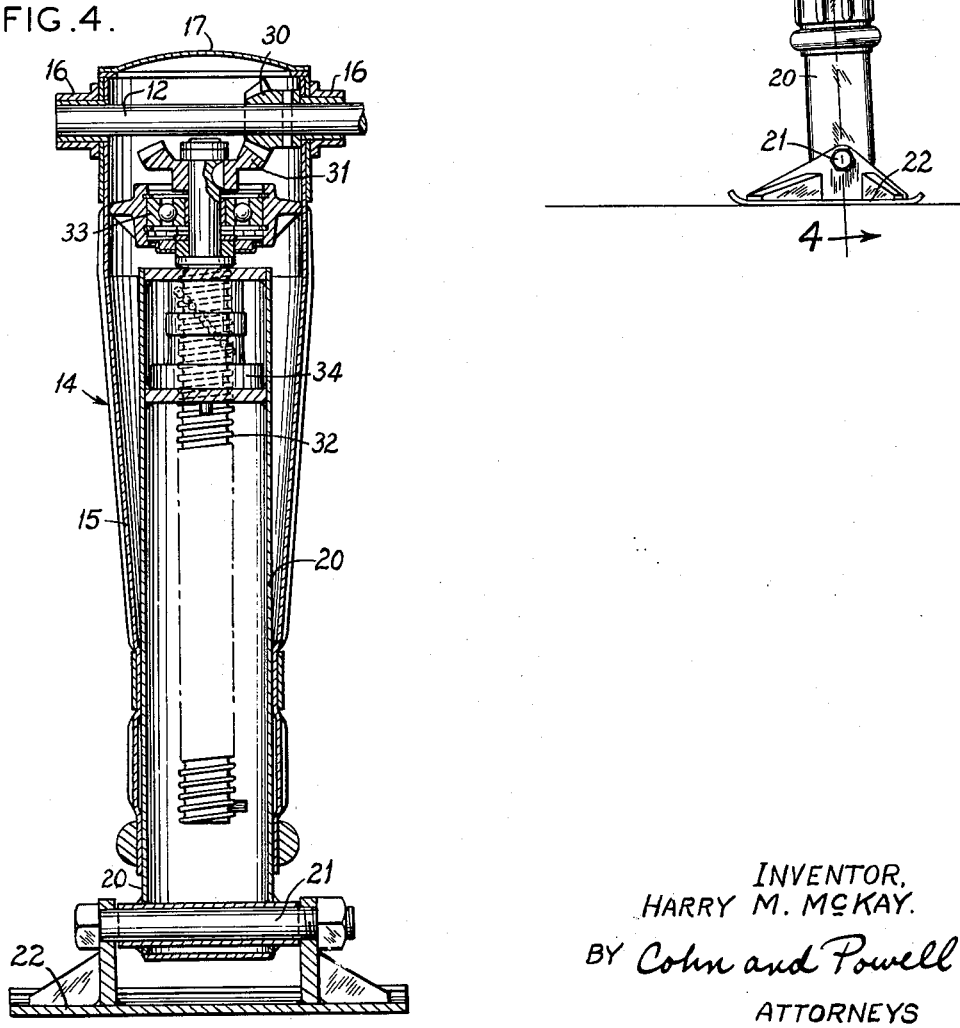
Fig. 4 is an enlarged cross sectional view of the supporting leg as seen along line 4—4 of Fig. 3.

A bevel gear 30 is drivingly connected to drive shaft 12 and is located within the tubular casing of leg section 15 (Fig. 4). The bevel gear 30 meshes with a coacting bevel gear 31 fixed to the upper end of a threaded screw shaft 32. The screw shaft 32 is located internally of leg section 20 and extends along its longitudinal axis. The upper end of screw shaft 32 extends above the upper end of leg section 20 and is journalled for rotation in bearing 33 fixed internally to leg section 15. Fixed internally to tubular leg section 20 is a nut 34 that threadedly engages the screw shaft 32. The particular configuration of the tubular casing comprising leg sections 15 and 20 preclude relative rotation of such leg sections yet permit telescopic adjustment of leg section 20 through the open lower end of leg section 15. As is apparent, upon rotation of drive shaft 12, bevel gears 30 and 31 and screw shaft 32, the nut 34 will travel along screw shaft 32 and hence cause telescopic adjustment of leg section 20.

Figure 3:
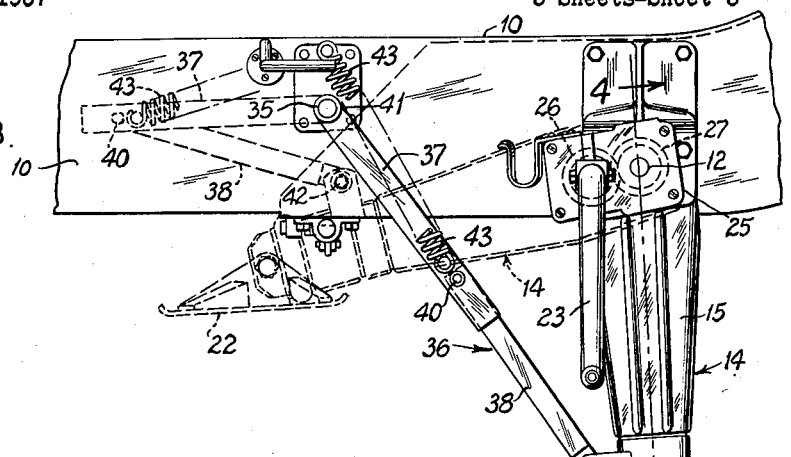
Fig. 3 is a fragmentary, side elevational view of the landing gear, as seen from the right hand side of Figs. 1 and 2; and shows in dashed lines the retracted position of such gear.

The retractable mechanism utilized to fold and extend the supporting leg 14 includes a transverse driven shaft 35 rotatively mounted by frame 10 of the trailer. A toggle brace referred to at 36 is operatively interconnected between the supporting leg 14 and the trailer frame 10. More particularly, the toggle brace 36 consists of a pair of link elements 37 and 38 disposed in overlapping relation and pivoted together at one end by pivot pin 40. The opposite end of link element 37 is drivingly attached to the end of driven shaft 35 as shown by reference numeral 41 in Fig. 3. The opposite end of link element 38 is pivotally connected by pin 42 to the lower end of leg section 15. A tension spring 43 is attached at one end to link element 37 and at the other end to a portion of the trailer frame 10. The tension spring 43 tends to hold the toggle brace 36 in its extended position as shown in Fig. 3 after such brace has been moved past its off-center aligned position, thus precluding unintended breaking action of the toggle brace 36.

As is seen best in Fig. 2, the supporting legs 14 at each side of the trailer are rigidly interconnected by a cross bar 44. A brace 45 is fixed centrally of cross bar 44 and is pivoted to the trailer frame. The bar 44 and brace 45 cooperate with driven shaft 35 to assure that the supporting legs are folded and extended in unison.

Figure 5:
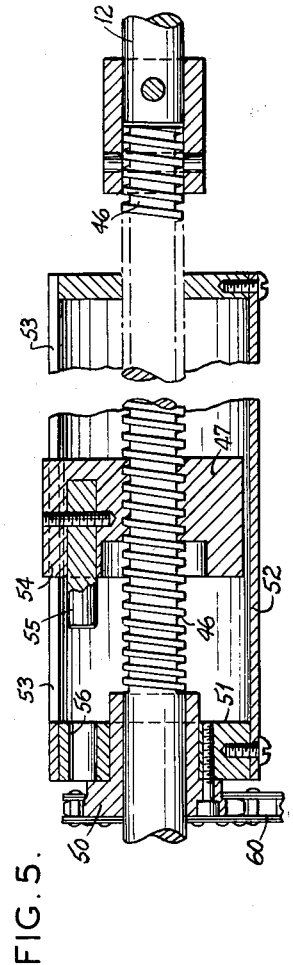
Fig. 5 is a fragmentary, enlarged cross sectional view of the clutch assembly as seen along line 5—5 of Fig. 1.

A drive connection is provided between the rotatable mechanism and the retractable mechanism, and more particularly between the drive shaft 12 and the driven shaft 35. This drive connection includes a clutch mechanism comprised of several component parts operatively connected to drive shaft 12. Referring to Fig. 5, a portion of drive shaft 12 is provided with screw threads 46 that engage and receive a threaded nut 47 constituting a drive clutch member. Further, the clutch assembly includes a sprocket 50 fixed to a driven clutch member 51, each of which is rotatively mounted on drive shaft 12. A sleeve 52 is attached to the driven clutch member 51 and extends over the threaded drive shaft portion 46 and receives therein the drive clutch member 47. The sleeve 52 is provided with a longitudinal slot 53 that receives a projecting shoulder 54 formed on the traveling drive clutch member 47, the slot 53 preventing relative rotation of sleeve 52 and driven clutch member 51 with respect to the drive clutch member 47. A pin 55 is fixed to the front face of drive clutch member 47 and is adapted to interfit a compatible socket 56 formed in driven clutch member 51.

It will be particularly noted that if socket 50, driven clutch member 51 and sleeve 52 are held stationary while drive shaft 12 is relatively rotated, the drive clutch member 47 will travel reciprocably along threaded shaft portion 46 toward or away from the driven clutch member 51, depending upon the direction of shaft rotation. As the drive clutch member 47 approaches the driven clutch member 51, the pin 55 will interfit its cooperating socket 56 until the drive clutch member 47 presses contiguously against the driven clutch member 51. Upon operative engagement of the clutch members 47 and 51 as described above, the drive clutch member 47 will rotate with drive shaft 12 and will cause rotation of driven clutch member 51 and sprocket 50.

Attached to driven shaft 35 is a sprocket 57 that is operatively interconnected with sprocket 50 by chain 60. Thus it is seen upon rotation of sprocket 50, the chain 60 will cause rotation of driven shaft 35.

A latch means is provided operatively between the trailer frame and the landing gear to retain selectively the landing gear in its fully retracted position. Such latch means includes a T-shaped catch element 61 (Fig. 6) having a peripheral depending flange 62, the catch element 61 being threadedly attached by connection 63 to cross bar 44. One of these T-shaped catch elements 61 is provided at each side of the landing gear immediately adjacent the supporting leg 14.

Located in the path of catch elements 61 at each side of the trailer frame is a latch element 64 that is slidably received in a sleeve 65. Each latch element 64 is provided with a cam shoulder 66 that operatively engages the coacting catch element 61 when the landing gear is retracted, the cam shoulder 66 serving to urge the latch element 64 inwardly out of the path of the catch element 61. Each latch element 64 is provided with an arcuate groove 67 adapted to receive the depending peripheral flange 62 of the cooperating catch element 61.

The latch elements 64 are pivotally attached to a T-shaped lever 70 by bars 71. The lever 70 is pivotally connected by arm 72, which is in turn pivotally connected to arm 73 fixed to lock shaft 74 rotatively mounted in the trailer frame. The shaft 74 extends outwardly of the trailer frame and is provided with a handle 75.

It will be obvious that upon rotation of handle 75 and lock shaft 74 in one direction the linkage mechanism constituted by lever arms 73—72—70 and 71 will cause retraction of the latch elements 64 out of the path of catch elements 61, while opposite rotation of lock shaft 74 will cause extension of the latch elements 64 into the path of the catch elements 61.

It is thought that the operation and functional advantages of the landing gear have become fully apparent from the foregoing detailed description of parts, but for completeness of disclosure such operation will be fully described.

For purposes of description, it is here assumed that the initial position of the supporting leg is extended as shown by full lines in Fig. 3 to a position in which the leg supports the trailer, and it is desired to retract and fold this landing gear. This retracting action is accomplished by merely turning handle 23 which in turn rotates drive shaft 12, and hence the gear train 26—27—30 and 31 operate to rotate screw shaft 32 and cause retraction of leg section 20 upwardly into leg section 15.

While the telescopic action of leg sections 20 and 15 is taking place, the rotation of the threaded portion of drive shaft 12 causes movement of drive clutch member 47 in a direction toward the driven clutch member 51. Obviously, at this stage of the operation, the sprocket 50 and attached driven clutch member 51 and sleeve 52 are held stationary by their operative connection with shaft 35, toggle brace 36 and leg 14. Further, it will be noted that tension spring 43 operates and tends to hold the leg 14 in its extended position, and thus tends to hold the sprocket 50 and driven clutch member 51 relatively stationary.

After the leg section 20 has been telescopically retracted into leg section 15, and the foot plate 22 has been operatively disengaged from the ground, the drive clutch 47 interfits and engages operatively the driven clutch member 51 as described above. When engaged, the clutch members 47 and 51 cause rotation of sprocket 50 with continued rotation of drive shaft 12. Through the action of chain 60 and sprocket 57, the driven shaft 35 is rotated in response to rotation of drive shaft 12. Because of the attachment of toggle brace 36 with driven shaft 35, the toggle brace 36 is broken and driven shaft 35 folds the leg 14 upwardly to the fully retracted position shown in dotted lines in Fig. 3. The complete retraction of supporting leg 14 is accomplished by one continuous turning of drive shaft 12.

As the landing gear is moved upwardly to its fully retracted position, the catch elements 61 engage the latch elements 64 and cam such latch elements out of their path. After the catch elements are moved above the latch elements 64, the lock shaft 74 is rotated by handle 75 to cause extension of the latch elements 64 through its connecting linkage 70—73 so that the peripheral flange 62 of each catch element 61 interfits and seats in groove 67 of coacting latch element 64 whereby to support the supporting leg in the fully retracted position.

When it is desired to lower the landing gear, the landing gear is raised slightly by further rotation of shaft 12 to permit withdrawal of latch elements 64 from operative connection with catch elements 61. Then, the shaft 12 is rotated in the opposite direction to lower supporting leg 14 to its fully extended position. The operative connection of clutch members 47 and 51 enable a positive driving of drive shaft 35 to effect extension of toggle brace 36.

After toggle brace 36 is located in its fully extended position shown in full lines in Fig. 3, the sprocket 50, driven clutch member 51 and sleeve 52 are again held stationary. Upon further rotation of drive shaft 12 in this direction, the drive clutch member 47 will move away from driven clutch member 51 and operatively disengage. Further rotation of shaft 12 will cause telescopic extension of leg section 20 so that the foot plate 22 engages the ground. Again, it will be noted that extension of the supporting legs 14 is accomplished by a continuous rotation of drive shaft 12 in one direction.

Although the invention has been described by making detailed reference to a single preferred embodiment, such detail is to be understood in an instructive, rather than in any restrictive sense, many variants being possible within the scope of the claims hereunto appended.

I claim as my invention:

1. A landing gear for trailers comprising a supporting leg including a first leg section and an adjustable second leg section telescopically interfitted with the first leg section, said second leg section having ground-engaging means on its lower end, a shaft rotatively mounted on said trailer, the first leg section being hingedly mounted on said shaft, means connecting said shaft to said second leg section for extending and retracting said second leg section upon rotation of said shaft, a clutch assembly including a drive member threadedly attached to said shaft and reciprocably movable thereon, and a driven member rotatively mounted and disposed in the path of said drive member, and retractable means connected to said driven member and to said supporting leg upon operative engagement of said drive and driven members.

2. A landing gear for trailers comprising a supporting leg including a first leg section and an adjustable second leg section telescopically interfitted with the first leg section, said second leg section having a ground-engaging means on its lower end, a shaft rotatively mounted on said trailer, the first leg section being hingedly mounted on said shaft, means operatively connecting said shaft to said second leg section for extending and retracting said second leg section upon rotation of said shaft, a clutch assembly including a drive member attached to said shaft and reciprocally movable thereon, a driven member rotatively mounted and disposed in the path of said drive member, the driven member being freely rotatably mounted on said shaft, the driven member having a sleeve in which the drive member moves, the sleeve being provided with a longitudinal slot, the drive member slidably engaging the sleeve and said slot to preclude relative rotation of said drive and driven members, retractable means operatively connected to said driven member and to said supporting leg including a positive drive connection for raising and lowering said supporting leg about said shaft upon operative engagement of said drive and driven members.

3. A landing gear for a trailer, comprising a supporting leg including a first leg section hingedly connected to the trailer, and a second leg section telescopically interfitted with the first leg section, the second leg section having ground-engaging means on its lower end, rotatable means operatively connected to said second leg section for extending and retracting said second leg section, a toggle brace connecting the said supporing leg and said trailer, means fixedly attached to said toggle brace, and an operative drive connection between the last said means and said rotatable means so that the said means fixedly attached to the brace swings the brace for raising and lowering said leg about said hinge connection upon actuation of said rotatable means.

4. A landing gear for a trailer, comprising a supporting leg including a first leg section hingedly connected to the trailer, and a second leg section telescopically interfitted with the first leg section, the second leg section having ground-engaging means on its lower end, rotatable means operatively connected to said second leg section for extending and retracting said second leg section, a toggle brace interconnecting the said supporting leg and said trailer, a driven shaft rotatively mounted on said trailer and drivingly attached to said toggle brace, and a drive connection including a clutch between the driven shaft and said rotatable means, whereby to raise and lower sequentially said supporting leg about said hinge connection upon actuation of said rotatable means.

5. A landing gear for a trailer, comprising a supporting leg including a first leg section and an adjustable second leg section telescopically interfitted with the first leg section, said second leg section having ground-engaging means on its lower end, a drive shaft rotatively mounted on said trailer, the first leg section being hingedly mounted on said drive shaft, means connecting said shaft with said second leg section for extending and retracting said second leg section upon rotation of said drive shaft, a toggle brace interconnecting the said supporting leg and said trailer, and means attached to said toggle brace including an operative drive connection with said rotatable drive shaft for raising and lowering said leg about said hinge connection upon actuation of said drive shaft.

6. A landing gear for trailers, comprising a supporting leg including a first leg section, and an adjustable second leg section telescopically interfitted with the first leg section, said second leg section having ground-engaging means on its lower end, a drive shaft rotatively mounted on said trailer, the first leg section being hingedly mounted on said drive shaft, means operatively connecting said drive shaft to said second leg section for extending and retracting said second leg section upon rotation of said drive shaft, a clutch assembly including a drive member threadedly attached to said drive shaft and reciprocably mounted and longitudinally movable thereon, a driven member rotatively mounted and disposed in the path of said drive member, a toggle brace interconnecting the said supporting leg and said trailer, and means attached to said toggle brace including an operative drive connection with said driven clutch member, whereby to raise and lower sequentially said supporting leg about said hinge connection upon actuation of said drive shaft.

7. The combination and arrangement of elements as set forth above in claim 6, but further characterized in that the toggle brace consists of a pair of link members pivotally connected together, and by the provision of a driven shaft rotatively mounted on said trailer, one of said link members being pivotally connected to said supporting leg, and the other link member being fixed to said driven shaft, and further characterized in that the operative drive connection is between the driven shaft and said driven clutch member.

8. The combination and arrangement of elements as set forth in claim 6 above, but further characterized in that the driven clutch member is freely rotatively mounted on said drive shaft, the driven member having a sleeve in which the drive member moves, the drive member slidably engaging said sleeve to preclude relative rotation of said drive and driven clutch members, and further characterized by the provision of a driven shaft rotatively mounted on said trailer, the toggle brace consisting of a pair of link members pivotally connected together, one of said link members being pivotally connected to said leg, the other link member being fixed to the said driven shaft, and further characterized in that the operative drive connection is between the said driven shaft and said driven clutch member.

9. A landing gear for trailers, comprising a supporting leg including a first leg section, and an adjustable second leg section telescopically interfitted with the first leg section, said second leg section having ground-engaging means on its lower end, a shaft rotatively mounted on said trailer, the first leg section being hingedly mounted on said shaft, means connecting said shaft to said second leg section for extending and retracting said second leg section upon rotation of said shaft, a clutch assembly including a drive member threadedly attached to said shaft and reciprocably movable thereon, and a driven member freely rotatively mounted on said shaft and disposed in the path of said drive member, the driven member having a sleeve in which the drive member moves, the drive member slidably engaging said sleeve to preclude relative rotation, and retractable means connected to said driven member and to said supporting leg upon operative engagement of said drive and driven member.

10. A landing gear for trailers, comprising a supporting leg including a first leg section, and an adjustable second leg section telescopically interfitted with the first leg section, said second leg section having ground-engaging means on its lower end, a shaft rotatively mounted on said trailer, the first leg section being hingedly mounted on said shaft, means connecting said shaft to said second leg section for extending and retracting said second leg section upon rotation of said shaft, a clutch assembly including a drive member threadedly attached to said shaft and reciprocally movable thereon, a driven member rotatively mounted on said shaft and disposed in the path of said drive member, the driven member having a sleeve along which the drive member moves, the sleeve being provided with a longitudinal slot, and the drive member slidably engaging the sleeve in said slot to preclude relative rotation of drive and driven members, and retractable means connected to said driven member and to said supporting leg upon operative engagement of said drive and driven members.

11. A landing gear for a trailer, comprising a supporting leg including a first leg section hingedly connected to the trailer, and a second leg section telescopically interfitted with the first leg section, the second leg section having ground-engaging means on its lower end, rotatable means operatively connected to said second leg section for extending and retracting said second leg section, a toggle brace interconnecting the said supporting leg and said trailer, a driven shaft rotatively mounted on said trailer, the toggle brace consisting of a pair of link members pivotally connected together, one of said link members being fixed to the said driven shaft, and a drive connection including a clutch between the driven shaft and said rotatable means, whereby to raise and lower sequentially said supporting leg about said hinge connection upon actuation of said rotatable means.

12. A landing gear for a trailer, comprising a supporting leg including a first leg section, and an adjustable second leg section telescopically interfitted with the first leg section, said second leg section having ground-engaging means on its lower end, the drive shaft rotatively mounted on said trailer, the first leg section being hingedly mounted on said drive shaft, means connecting said shaft with said second leg section for extending and retracting said second leg section upon rotation of said drive shaft, a toggle brace interconnecting the said supporting leg and said trailer, a driven shaft rotatively mounted on said trailer and drivingly attached to said toggle brace, and a drive connection including a clutch between the driven shaft and said drive shaft for sequentially raising and lowering said leg about said hinge connection upon actuation of said drive shaft.

13. A landing gear for a trailer, comprising a supporting leg including a first leg section, and an adjustable second leg section telescopically interfitted with the first leg section, said second leg section having ground-engaging means on its lower end, a drive shaft rotatively mounted on said trailer, the first leg section being hingedly mounted on said drive shaft, means connecting said shaft with said second leg section for extending and retracting said second leg section upon rotation of said drive shaft, a toggle brace interconnecting the said supporting leg and said trailer, a driven shaft rotatively mounted on said trailer and drivingly attached to said toggle brace, the toggle brace consisting of a pair of link members pivotally connected together, one of said link members being pivotally connected to said leg, and the other link member being fixed to the driven shaft, and a drive connection including a clutch between the driven shaft and said drive shaft.

References Cited in the file of this patent

UNITED STATES PATENTS

| 1,988,304 | Duman | Jan. 15, 1934 |
| 2,118,004 | Black | May 17, 1938 |
| 2,137,703 | Seyferth | Nov. 22, 1938 |
| 2,882,070 | Bill | Apr. 14, 1959 |